(12) United States Patent
Nair

(10) Patent No.: US 7,977,887 B2
(45) Date of Patent: Jul. 12, 2011

(54) LOW LEAKAGE CURRENT LED DRIVE APPARATUS WITH FAULT PROTECTION AND DIAGNOSTICS

(75) Inventor: Balakrishnan Nair Vijayakumaran Nair, Singapore (SG)

(73) Assignee: Delphi Technologies, Inc., Troy, MI (US)

( * ) Notice: Subject to any disclaimer, the term of this patent is extended or adjusted under 35 U.S.C. 154(b) by 479 days.

(21) Appl. No.: 12/283,076

(22) Filed: Sep. 9, 2008

(65) Prior Publication Data

US 2010/0060170 A1    Mar. 11, 2010

(51) Int. Cl.
    H01J 1/60      (2006.01)
    H05B 37/04     (2006.01)
    H05B 37/02     (2006.01)

(52) U.S. Cl. .................. 315/136; 315/291; 315/308

(58) Field of Classification Search .......... 315/136, 315/291, 308
    See application file for complete search history.

(56) References Cited

U.S. PATENT DOCUMENTS

| | | | | |
|---|---|---|---|---|
| 5,001,398 A * | 3/1991 | Dunn | ............. | 315/77 |
| 5,877,596 A * | 3/1999 | Allison | ............. | 315/308 |
| 6,320,330 B1 * | 11/2001 | Haavisto et al. | ............. | 315/291 |
| 6,492,781 B2 * | 12/2002 | Palmer et al. | ............. | 315/307 |
| 6,856,098 B2 * | 2/2005 | Piaskowski | ............. | 315/224 |
| 6,864,641 B2 * | 3/2005 | Dygert | ............. | 315/216 |
| 6,979,959 B2 * | 12/2005 | Henry | ............. | 315/291 |
| 7,049,767 B2 * | 5/2006 | Wilhelm | ............. | 315/291 |
| 7,119,498 B2 * | 10/2006 | Baldwin et al. | ............. | 315/291 |
| 7,265,504 B2 * | 9/2007 | Grant | ............. | 315/308 |
| 7,541,785 B2 * | 6/2009 | Murakami | ............. | 323/222 |
| 7,830,099 B2 * | 11/2010 | Ger et al. | ............. | 315/291 |
| 7,855,515 B2 * | 12/2010 | Huang et al. | ............. | 315/185 R |
| 7,888,890 B2 * | 2/2011 | Joos et al. | ............. | 315/308 |
| 2003/0025464 A1 * | 2/2003 | Konopka | ............. | 315/291 |
| 2003/0062850 A1 * | 4/2003 | Konopka et al. | ............. | 315/224 |
| 2003/0151378 A1 * | 8/2003 | Busse et al. | ............. | 315/291 |
| 2004/0021429 A1 * | 2/2004 | Shackle | ............. | 315/291 |
| 2004/0032222 A1 * | 2/2004 | Green | ............. | 315/291 |
| 2004/0164685 A1 * | 8/2004 | Dygert | ............. | 315/224 |
| 2004/0183477 A1 * | 9/2004 | Newman et al. | ............. | 315/291 |
| 2005/0007037 A1 * | 1/2005 | Ribarich | ............. | 315/291 |
| 2005/0077838 A1 * | 4/2005 | Blumel | ............. | 315/289 |
| 2005/0093461 A1 * | 5/2005 | Cull et al. | ............. | 315/149 |
| 2005/0140315 A1 * | 6/2005 | Baldwin et al. | ............. | 315/308 |
| 2005/0146290 A1 * | 7/2005 | Gray | ............. | 315/307 |

(Continued)

OTHER PUBLICATIONS

European Search Report dated Dec. 1, 2010.

*Primary Examiner* — Rexford N Barnie
*Assistant Examiner* — Matthew C Tabler
(74) *Attorney, Agent, or Firm* — Jimmy L. Funke

(57) ABSTRACT

An LED drive apparatus includes a microprocessor having a configurable input/output port, a FET current control transistor, and a diagnostic interface circuit. The diagnostic interface circuit includes a transistor having an input coupled to a junction between the FET and the LED, and an output coupled to an input of the FET. The microprocessor input/output port is coupled to the input of the FET for turning the LED ON and OFF and performing fault protection and diagnostics. At each desired transition of the LED, the microprocessor configures its input/output port as an output and momentarily sets the output state to achieve the desired transition, then re-configures the input/output port to determine the conduction state of the diagnostic interface circuit transistor, and determines an output fault status of the drive apparatus based on the determined conduction state.

8 Claims, 3 Drawing Sheets

U.S. PATENT DOCUMENTS

| | | |
|---|---|---|
| 2006/0033456 A1* | 2/2006 | Tsai et al. ............. 315/312 |
| 2006/0087260 A1* | 4/2006 | Herzer et al. ............. 315/291 |
| 2006/0158131 A1* | 7/2006 | Mitsuyasu et al. ......... 315/209 R |
| 2006/0220571 A1* | 10/2006 | Howell et al. ............. 315/86 |
| 2006/0261748 A1* | 11/2006 | Nukisato et al. ............. 315/291 |
| 2007/0120506 A1* | 5/2007 | Grant ............. 315/312 |
| 2007/0159117 A1* | 7/2007 | Chen et al. ............. 315/291 |
| 2008/0018268 A1* | 1/2008 | Green ............. 315/308 |
| 2008/0054824 A1* | 3/2008 | Ribarich ............. 315/291 |
| 2008/0061713 A1* | 3/2008 | Zeng ............. 315/291 |
| 2008/0080105 A1* | 4/2008 | Blaha et al. ............. 361/38 |
| 2008/0088260 A1* | 4/2008 | Hsu et al. ............. 315/294 |
| 2008/0211426 A1* | 9/2008 | Kuo et al. ............. 315/282 |
| 2008/0278085 A1* | 11/2008 | Yu et al. ............. 315/224 |
| 2008/0297065 A1* | 12/2008 | Mubaslat et al. ............. 315/291 |

* cited by examiner

US 7,977,887 B2

LOW LEAKAGE CURRENT LED DRIVE APPARATUS WITH FAULT PROTECTION AND DIAGNOSTICS

TECHNICAL FIELD

The present invention relates to circuitry for driving one or more light emitting diodes (LEDs), and more particularly to a low leakage current LED drive apparatus with fault protection and diagnostics.

BACKGROUND OF THE INVENTION

High intensity LEDs have been utilized in a variety of lighting applications traditionally implemented with incandescent lamps, primarily due to their superior reliability and photonic efficiency. Typically, a field-effect transistor (FET) is used to control the LED current, and the FET is modulated ON and OFF by a pre-FET drive circuit under the control of a microprocessor. However, pre-FET drive circuits that include open-circuit and short-to-ground diagnostic capability typically require a leakage current in the range of 100 uA-200 uA when the LED is supposed to be OFF, and a leakage current of that magnitude is sufficient to make a high intensity LED glow perceptibly. This presents a problem, particularly in applications where the ambient light is low, such as in a vehicle being driven at night. While the open-circuit and short-to-ground diagnostic capability can be disabled to solve the leakage current problem, many LED lighting applications require fault protection and diagnostics. Accordingly, what is needed is a low leakage current LED drive apparatus that provides fault protection and diagnostics.

SUMMARY OF THE INVENTION

The present invention is directed to an improved LED drive apparatus including a microprocessor having a configurable input/output (I/O) port, a FET current control transistor, and a diagnostic interface circuit. The diagnostic interface circuit includes a transistor having an input coupled to a junction between the FET and the LED, and an output coupled to an input of the FET. The microprocessor I/O port is coupled to the input of the FET for turning the LED ON and OFF and performing fault protection and diagnostics. At each desired transition of the LED, the microprocessor configures its input/output port as an "output" and momentarily sets the output state to achieve the desired transition, then re-configures the input/output port as an "input" to determine the conduction state of the diagnostic interface circuit transistor, and determines an output fault status of the drive apparatus based on the determined conduction state.

DESCRIPTION OF THE PREFERRED EMBODIMENT

Figure 1:
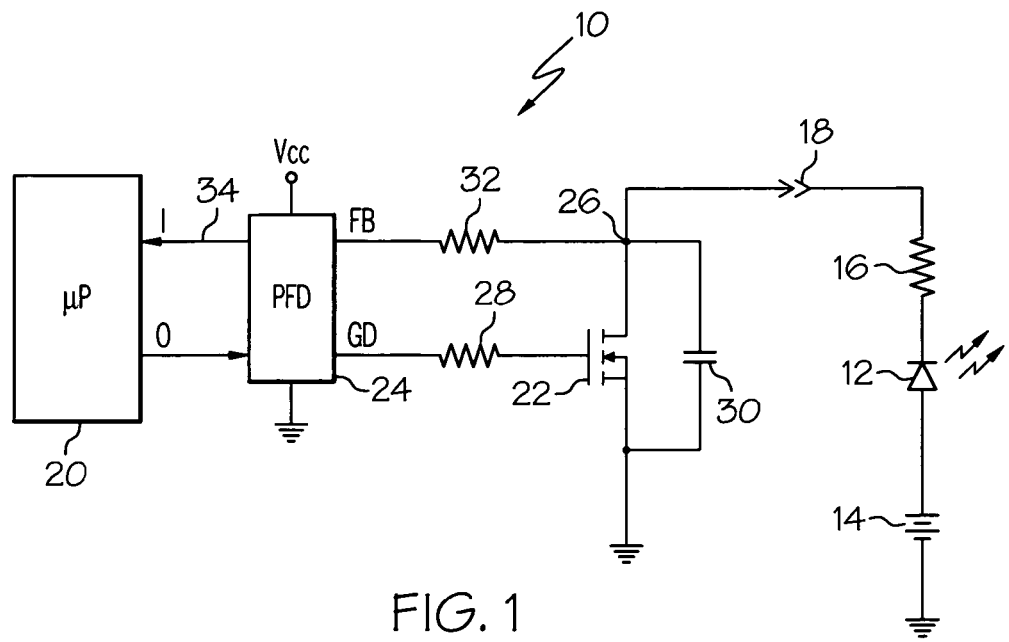
FIG. 1 is a circuit diagram of a prior art LED drive apparatus.

Referring to FIG. 1, the reference numeral 10 generally designates a prior art drive apparatus for controlling the current supplied to a high intensity LED 12. The anode of LED 12 is coupled to the positive terminal of a DC source such as the battery 14, and the cathode of LED 12 is coupled to an output terminal 26 of drive apparatus 10 via a current limiting resistor 16 and a connector 18. The drive apparatus 10 includes a microprocessor (µP) 20, a FET current control transistor 22, and a pre-FET drive circuit (PFD) 24. The drain of FET 22 is coupled to output terminal 26, and the source of FET 22 is coupled to ground. The gate of FET 22 is coupled to a gate drive (GD) output of pre-FET drive circuit 24 via resistor 28. A capacitor 30 is connected between the output terminal 26 and ground for RF de-coupling, and the output terminal 26 is coupled to a feedback (FB) input of pre-FET drive circuit 24 via resistor 32. The pre-FET drive circuit 24 turns FET 22 ON and OFF based on the logic state at the output port (O) of microprocessor 20 for driving LED 12 ON and OFF. During OFF periods of LED 12, pre-FET drive circuit 24 permits a leakage current to flow through the feedback pin (FB) and the drain-to-source circuit of FET 22 for open-circuit and short-to-ground fault detection. An open-circuit fault occurs when the connector 18 or a conductor attached to connector 18 fails, and a short-to-ground fault occurs when a connector failure or pinched conductor shorts the output terminal 26 of drive apparatus 10 to ground potential. In each instance, the voltage at output terminal 26 is lower than normal, and when this condition is detected at the feedback input of pre-FET drive circuit 24, a fault indication is provided through a serial interface (I) of microprocessor 20 as represented by line 34.

As mentioned above, the leakage current permitted by the prior art pre-FET drive circuit 24 for open-circuit and short-to-ground fault detection is typically in the range of 100-200 microamperes, which is sufficient to make the high intensity LED 12 glow perceptibly even though it is supposed to be OFF. In contrast, the drive apparatus of the present invention provides fault protection and diagnostics while limiting OFF-period leakage current to a value well below a current threshold at which LED 12 begins to glow perceptibly.

Figure 2:
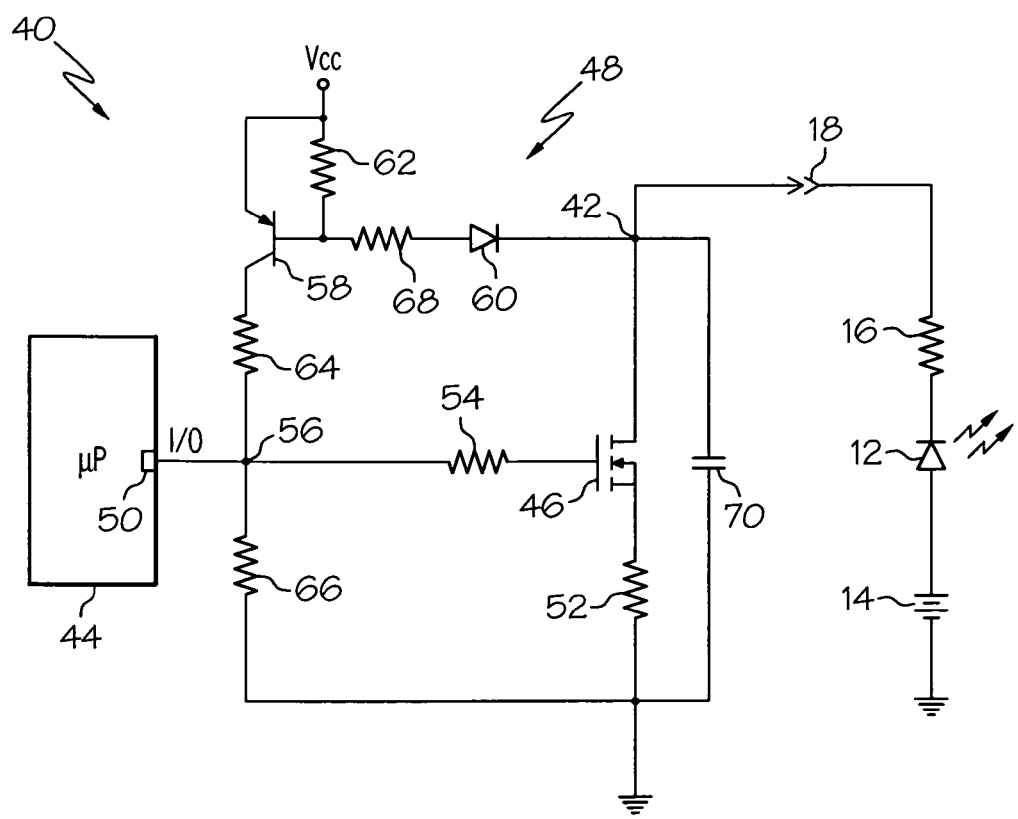
FIG. 2 is a circuit diagram of a LED drive apparatus according to the present invention, including a microprocessor having a configurable input/output port, a FET current control transistor, and a diagnostic interface circuit.

Referring to FIG. 2, an LED drive apparatus according to the present invention is generally designated by the reference numeral 40. As in FIG. 1, the anode of high intensity LED 12 is coupled to the positive terminal of battery 14, and the cathode is coupled to an output terminal 42 of drive apparatus 40 via current limiting resistor 16 and connector 18. The drive apparatus 40 includes a microprocessor (µP) 44, a FET current control transistor 46, and a diagnostic interface circuit 48. The microprocessor 44 includes an input/output port (I/O) 50 that is selectively configurable as an input or an output, and I/O port 50 is coupled to control terminal 56. Control terminal 56 is coupled to the gate (input) of FET 46 via resistor 54, and the diagnostic interface circuit 48 is coupled between control terminal 56 and the other terminals of FET 46. The drain (output) of FET 46 is coupled to the output terminal 42, the source of FET 46 is coupled to ground through a current limiting resistor 52.

Diagnostic interface circuit 48 includes a bipolar transistor 58, a diode 60, resistors 62-68, and a capacitor 70. The emitter (output) of transistor 58 is connected to a logic voltage (Vcc) such as 5 VDC, and the resistor 62 is connected between the transistor's emitter and base to bias transistor 58 to a normally-OFF state. The collector of transistor 58 is connected to control terminal 56 via the resistor 64, and the resistor 66 connects the control terminal 56 to ground potential. The base (input) of transistor 58 is coupled to output terminal 42 through the series combination of resistor 68 and diode 60. The capacitor 70 provides RF decoupling like capacitor 30 of the prior art driver 10, and additionally facilitates diagnosis of an open-circuit fault condition as described below.

During ON periods of LED 12 in the absence fault conditions, both FET 46 and transistor 58 are biased ON, while during OFF periods of LED 12 in the absence fault conditions, both FET 46 and transistor 58 are biased OFF, and diode 60 is reverse-biased. Thus, in the OFF state of LED 12, the leakage current of drive apparatus 40 is limited to the minimum OFF-state leakage current of FET 46, which is typically only a few microamperes.

Figure 3:
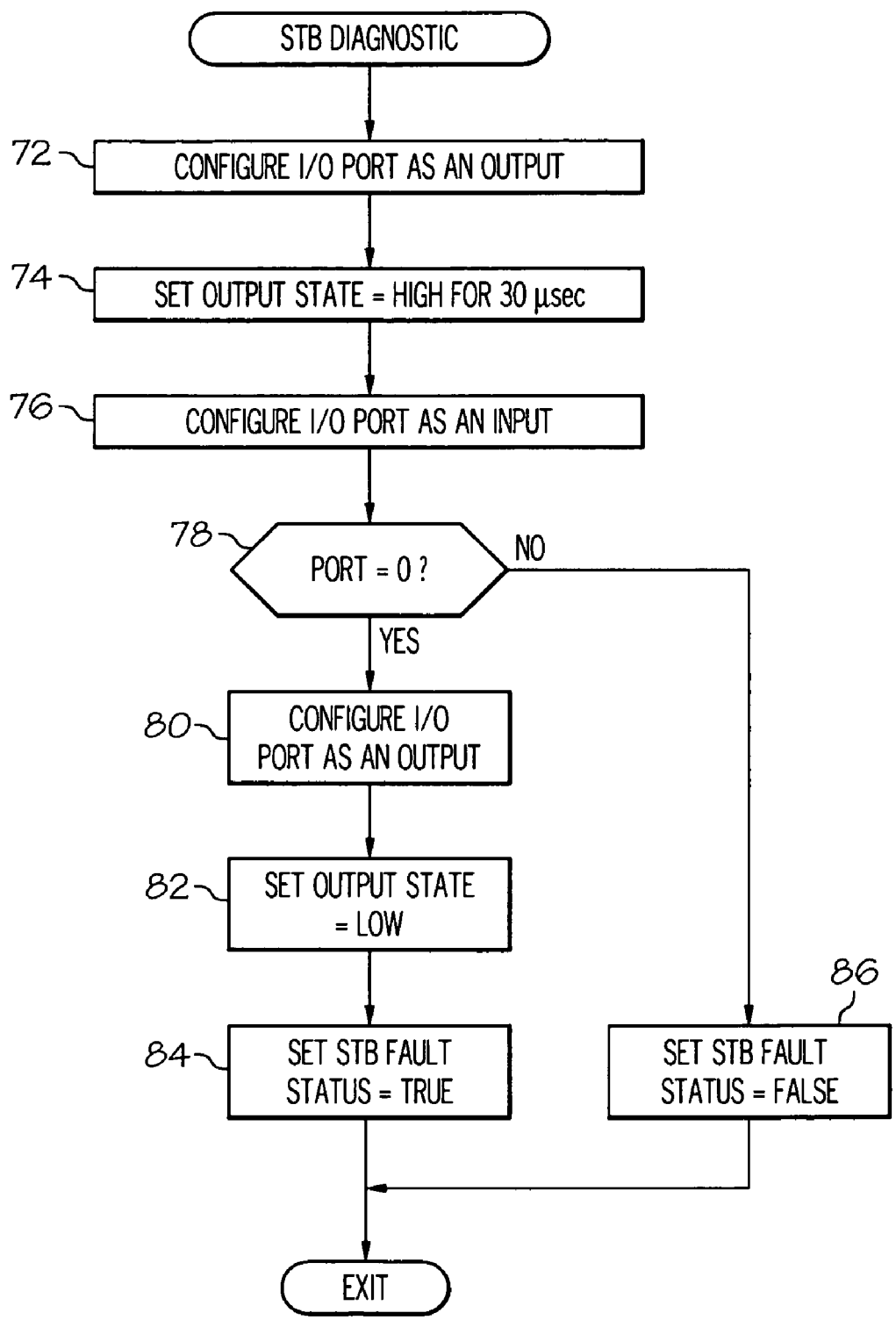
FIG. 3 is a flow diagram representing a software routine executed by the microprocessor of FIG. 2 for carrying out a short-to-battery (STB) diagnostic and an OFF-to-ON transition of the LED.

Microprocessor 44 initiates fault detection at each desired OFF-to-ON and ON-to-OFF transition of LED 12 by configuring I/O port 50 as an output with the desired output state for a predefined interval such as 30 µsec, and then configuring I/O port 50 as an input and sampling the voltage at control terminal 56. If a fault is detected, I/O port 50 is re-configured as an output, and set to a logic zero to hold FET 46 OFF. If no fault is detected, the diagnostic interface circuit 48 latches FET 46 to maintain the desired output state of LED 12. FIG. 3 is a flow diagram representing a software routine executed by microprocessor 44 at a desired OFF-to-ON transition of LED 12 for diagnosing and protecting against short-to-battery (STB) output fault conditions; and FIG. 4 is a flow diagram representing a software routine executed by microprocessor 44 at a desired ON-to-OFF transition of LED 12 for diagnosing open-circuit (OC) and short-to-ground (STG) output fault conditions.

FIG. 3 depicts a flow diagram of the routine executed at a desired OFF-to-ON transition of LED 12 and periodically in part during the ensuing ON state of LED 12. The STB diagnostic is initiated by executing blocks 72, 74 and 76 to configure I/O port 50 as an output, to set the output state high (i.e., to a logic one voltage) for 30 µsec, and then to re-configure I/O port 50 as an input for sampling the voltage at control terminal 56. If there is a STB output fault condition (i.e., if a connector failure or pinched conductor shorts the output terminal 42 to the positive terminal of battery 14), FET 46 will momentarily turn ON, with resistor 52 limiting its current to a safe value, but transistor 58 remains OFF due to the high voltage at output terminal 42 (or turns OFF if the STB condition occurs during the ON state of LED 12). Consequently, resistor 66 will pull the voltage at control terminal 56 substantially to ground potential, and the voltage sampled by microprocessor 44 at block 78 will be low (i.e., a logic zero). In this case, the blocks 80, 82 and 84 are executed to re-configure I/O port 50 as an output, to set the output state to low to hold FET 46 OFF, and to set the STB fault status to True.

In the absence of a STB output fault condition, the 30 µsec output pulse at I/O port 50 turns both FET 46 and transistor 58 ON, and the current sourced by transistor 58 sustains a high voltage at control terminal 56 when the I/O port 50 is re-configured as an input at block 76 to sample the control terminal voltage. Since the high voltage at control terminal 56 latches FET 46 ON, the microprocessor 44 simply executes block 86 to set the STB fault status to False when the voltage sampled at block 76 is high. In other words, microprocessor 44 does not need to continue driving FET 46 to maintain activation of LED 12 because FET 46 is held ON by transistor 58, through the divider action of resistors 64 and 66. However, in the ensuing ON state of LED 12, the microprocessor 44 periodically re-executes block 78 to detect an STB fault that occurs during the ON state.

Figure 4:
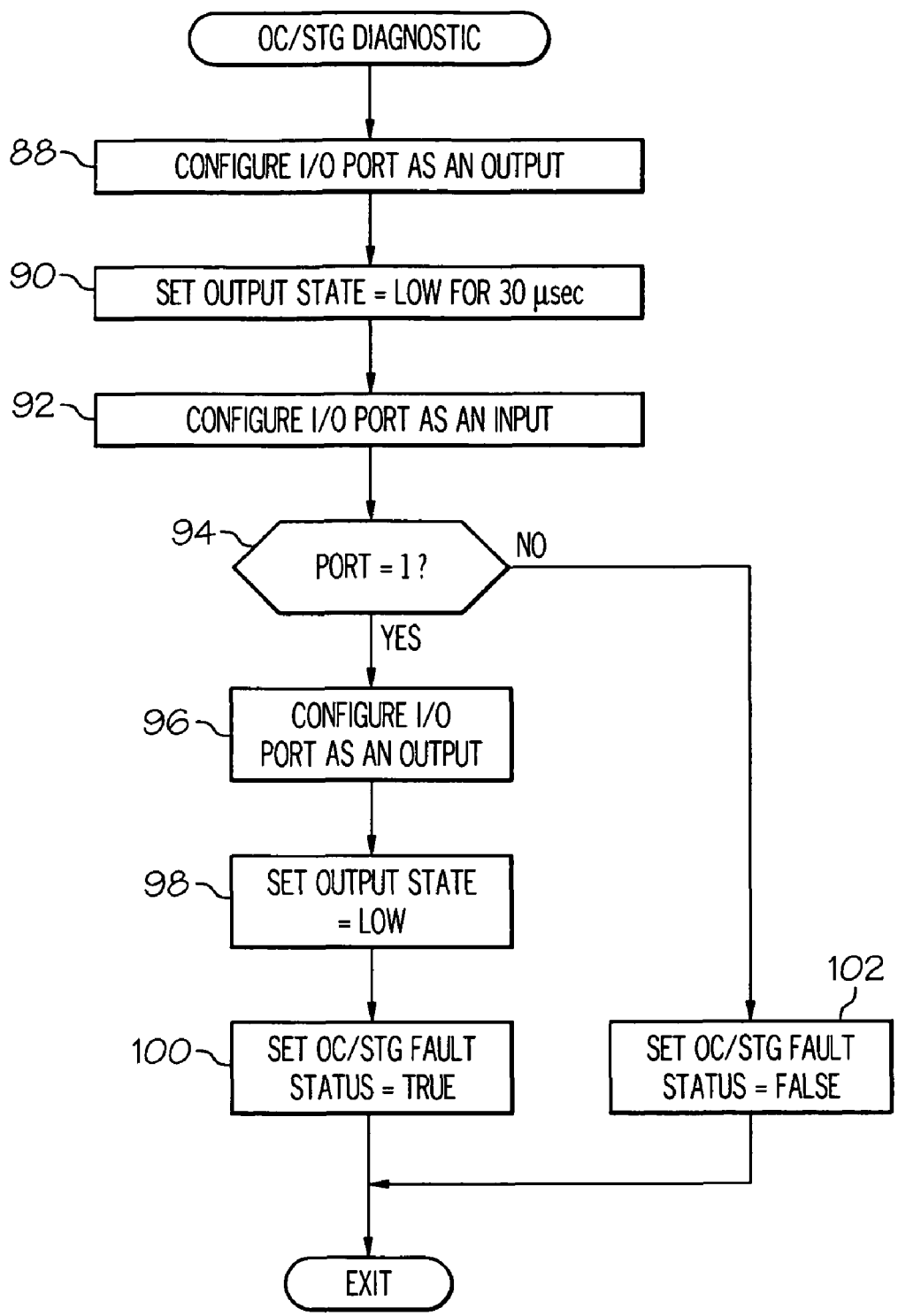
FIG. 4 is a flow diagram representing a software routine executed by the microprocessor of FIG. 2 for carrying out an open-circuit and short-to-ground (STG) diagnostic and an ON-to-OFF transition of the LED.

FIG. 4 depicts a flow diagram of the routine executed at a desired ON-to-OFF transition of LED 12. The OC/STG diagnostic is initiated by executing blocks 88, 90 and 92 to configure I/O port 50 as an output, to set the output state low (i.e., to a logic zero voltage) for 30 µsec, and then to re-configure I/O port 50 as an input for sampling the voltage at control terminal 56.

If there is a STG output fault condition (i.e., if a connector failure or pinched conductor shorts the output terminal 42 to ground), transistor 58 will be ON due to the ground voltage at output terminal 42. Consequently, the transistor 58 sources current through the resistors 64 and 66, and the voltage sampled by microprocessor 44 at block 94 will be high (i.e., a logic one). In this case, the blocks 96, 98 and 100 are executed to re-configure I/O port 50 as an output, to set the output state to low to hold FET 46 OFF, and to set the OC/STG fault status to True.

If there is an open-circuit output fault condition (i.e., if the connector 18 or a conductor or component between output terminal 42 and battery 14 is electrically open) when blocks 88 and 90 are executed, FET 46 will turn OFF and capacitor 70 will slowly charge through resistor 62, the base-emitter junction of transistor 58, resistor 68 and diode 60. In an exemplary implementation, the resistors 62 and 68 have resistance values of 30 kilo-ohms and 50 kilo-ohms, respectively, and nearly 800 µsec is required to charge capacitor 70. The transistor 58 will still be ON when microprocessor 44 executes blocks 92 and 94, and block 94 will be answered in the affirmative. As with the OC failure, the blocks 96, 98 and 100 are then executed to re-configure I/O port 50 as an output, to set the output state to low to hold FET 46 OFF, and to set the OC/STG fault status to True.

In the absence of an output fault condition, executing blocks 88 and 90 will turn OFF FET 46, and the capacitor 70 will quickly charge through LED 12 and resistor 16 to a voltage sufficient to turn OFF transistor 58. In an exemplary implementation, the resistor 16 has a resistance value of only 680 ohms, and the capacitor 70 charges to the Vcc voltage in approximately 10 µsec. As a result, transistor 58 is OFF when microprocessor 44 executes blocks 92 and 94 to check the voltage at control terminal 56, and block 94 is answered in the negative. In this case, block 102 is simply executed set the OC/STG fault status to False, and the resistor 66 holds FET 46 OFF.

In summary, the LED drive apparatus of the present invention achieves a superior level of fault protection by providing fault latching for OC, STB and STG output fault conditions, while essentially eliminating leakage currents that cause LED 12 to glow when it is supposed to be OFF. While the prior driver circuit 10 permits significant leakage current during OFF periods of the LED 12 in order to detect output fault conditions, the drive apparatus 40 diagnoses output fault conditions in a new and different way that does not depend on leakage current. Accordingly, the drive apparatus 40 limits OFF-period leakage current to only a few microamperes instead of the usual 100-200 microamperes. At the same time, the diagnostic interface circuit 48 costs significantly less than the prior art pre-FET drive circuit 24, and the software burden of microprocessor 44 is barely increased.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. Drive apparatus for an LED, comprising:
   a controller having an I/O port selectively configurable as an output or an input, said I/O port being coupled to a control terminal of the drive apparatus;
   a FET having an input coupled to said control terminal, and an output coupled to the LED via an output terminal of the drive apparatus for selectively completing a current path through the LED to selectively turn the LED ON and OFF;
   a diagnostic interface circuit including a transistor having an input coupled to the output terminal of said drive apparatus and a output coupled to the control terminal of said drive apparatus, said transistor having a conduction state that is diagnostic of an output fault condition; and
   control means effective at a desired ON-to-OFF or OFF-to-ON transition of said LED to first configure said I/O port as an output for a predetermined interval to initiate the desired transition of said LED, and then re-configure said I/O port as an input for sampling a voltage at said control terminal to determine the conduction state of said transistor and diagnose said output fault condition.

2. The drive apparatus of claim 1, where:
   the desired transition of said LED is an OFF-to-ON transition, and the transistor of said diagnostic interface circuit has an OFF-conduction state if there is a short-to-battery output fault condition, but otherwise has an ON-conduction state.

3. The drive apparatus of claim 2, where:
   the ON-conduction state of the diagnostic interface transistor latches the FET on to complete the OFF-to-ON transition of said LED.

4. The drive apparatus of claim 2, where:
   said control means is effective when the sampled voltage is indicative of the short-to-battery output fault condition to re-configure said I/O port as an output for turning OFF said FET and producing an output fault condition indication.

5. The drive apparatus of claim 1, where:
   the desired transition of said LED is an ON-to-OFF transition, and the transistor of said diagnostic interface circuit has an ON-conduction state if there is a short-to-ground or open-circuit output fault condition, but otherwise has an OFF-conduction state.

6. The drive apparatus of claim 5, where:
   the OFF-conduction state of the diagnostic interface circuit transistor latches the FET OFF to complete the ON-to-OFF transition of said LED.

7. The drive apparatus of claim 5, where:
   said control means is effective when the sampled voltage is indicative of the short-to-ground output fault condition to re-configure said I/O port as an output for holding said FET OFF and producing an output fault condition indication.

8. The drive apparatus of claim 5, where:
   said diagnostic interface circuit includes a capacitor coupled to said output terminal that charges through the diagnostic interface circuit transistor at a first charging rate if there is an open-circuit output fault condition, and that charges through said LED at a second rate that is faster than said first rate if there is no output fault condition to terminate the ON-conduction state of said diagnostic interface circuit transistor before said control means re-configures said I/O port as an input for sampling the voltage at said control terminal.

* * * * *